United States Patent
Martin et al.

(10) Patent No.: US 7,809,803 B2
(45) Date of Patent: Oct. 5, 2010

(54) SYSTEM AND METHOD FOR TRANSFERRING DATA TO A PORTABLE ELECTRONIC DEVICE

(75) Inventors: Daryl Martin, Paradise (CA); John F. J. F. (Sean) Wilson, Waterloo (CA); Christopher O'Keefe, St. John's (CA)

(73) Assignee: Research In Motion Limited, Waterloo, Ontario (CA)

( * ) Notice: Subject to any disclaimer, the term of this patent is extended or adjusted under 35 U.S.C. 154(b) by 475 days.

(21) Appl. No.: 11/769,773

(22) Filed: Jun. 28, 2007

(65) Prior Publication Data

US 2009/0006530 A1 Jan. 1, 2009

(51) Int. Cl.
*G06F 15/16* (2006.01)
*H04M 11/00* (2006.01)

(52) U.S. Cl. .................. 709/217; 709/200; 709/203

(58) Field of Classification Search .................. None
See application file for complete search history.

(56) References Cited

U.S. PATENT DOCUMENTS

| | | | |
|---|---|---|---|
| 2002/0068599 A1* | 6/2002 | Rodriguez et al. | 455/550 |
| 2004/0162986 A1* | 8/2004 | Metzger | 713/176 |
| 2006/0239276 A1* | 10/2006 | Rodbarry et al. | 370/401 |
| 2007/0143414 A1* | 6/2007 | Daigle | 709/206 |
| 2007/0160070 A1* | 7/2007 | Buchhop et al. | 370/401 |
| 2007/0168562 A1* | 7/2007 | Kimbrell | 709/248 |
| 2007/0293207 A1* | 12/2007 | Guedalia et al. | 455/415 |

FOREIGN PATENT DOCUMENTS

| | | |
|---|---|---|
| WO | 02069585 A | 9/2002 |
| WO | WO 2004/074999 A2 * | 9/2004 |
| WO | WO 2005/060228 A1 * | 6/2005 |
| WO | WO 2007/004233 A1 * | 1/2007 |

OTHER PUBLICATIONS

Jilles Van Gurp, et al: "Mobile Service Oriented Architectures (MOSOA)", Distributed Applications and Interoperable Systems Lecture Notes in Computer Science; LNCS, Springer-Verlag, BE, vol. 4025, 2006, pp. 1-15, XP019036790, ISBN: 3-540-35126-4.
Weber M., et al: "Mobile Entertainment Using Personal Avatars", Telecommunications, 2005, Contel 2005. Proceedings of the 8th International Conference on Zagreb, Croatia Jun. 15-17, 2005, Piscataway, NJ, USA, IEEE, Jun. 15, 2005, pp. 341-346, XP010810346, ISBN: 953-184-081-4.
Examination Report dated Dec. 6, 2007, European Patent Office.
Damianos L E; Cuomo D; Griffith J; Hirst D M; Smallwood J: "Exploring the Adoption, Utility and Social Influences of Social Bookmarking in a Corporate Environment". Proceedings of the 40th Hawaii International Conference on System Sciences, Jan. 3-6, 2007, IEEE Comput. Soc. Jan. 2007, pp. 1-10, Los Alamitos, CA, USA.
EP 07 111 265.0 Examination Report dated Sep. 29, 2008.

\* cited by examiner

*Primary Examiner*—Hassan Phillips
(74) *Attorney, Agent, or Firm*—Perry & Currier Inc.

(57) ABSTRACT

A method of transferring data to a portable electronic device includes providing a link for pushing data to the portable electronic device, receiving a selection of the push link, receiving an identifier of the portable electronic device for delivery of the data thereto, and transmitting the data to the portable electronic device.

15 Claims, 4 Drawing Sheets

SYSTEM AND METHOD FOR TRANSFERRING DATA TO A PORTABLE ELECTRONIC DEVICE

The present application relates generally to data transfer to portable electronic devices.

Portable electronic devices are widely used and can provide a variety of functions using various applications such as calendar, address book, messaging, Web browser, mapping and other applications. Portable electronic devices can include several types of devices such as simple cellular telephones, smart telephones, and wireless PDAs. These devices run on a wide variety of networks from data-only networks such as Mobitex and DataTAC to complex voice and data networks such as GSM/GPRS, CDMA, EDGE, UMTS and CDMA2000 networks.

A wide variety of data is associated with the various applications on the portable electronic devices. For example, a portable electronic device includes data for each contact in the address book, addresses for each location for a mapping application and bookmarks for each address in the Web browser. To add this information, the user either enters the information by typing directly into the portable electronic device or by typing into a computer that includes software for synchronizing with the portable electronic device. When such information is found on a computer that does not include software for synchronizing with the portable electronic device, such as a public computer terminal, the information is not easily transferred to the portable electronic device. For example, a Web site address that is accessed at a public computer terminal must be typed on the portable electronic device for storage.

Thus, there is no easy method of transferring data to the portable electronic device. Improvements in transfer of data are therefore desirable.

GENERAL

According to one aspect there may be provided a method of transferring data to a portable electronic device. The method may include providing a link for pushing data to the portable electronic device, receiving a selection of the push link, receiving an identifier of the portable electronic device for delivery of the data thereto, and transmitting the data to the portable electronic device.

According to another aspect, there may be provided a system for transferring data to a portable electronic device. The system may comprise at least one system server connected to a network and operable to execute applications for providing a link for pushing data to said portable electronic device, receiving a selection of said push link and an identifier of said portable electronic device for delivery of said data thereto, and transmitting said data to said portable electronic device.

According to another aspect, there may be provided a computer program product for controlling a system server. The computer program product may comprise a computer-readable medium having computer-readable code embodied therein for implementing the above method in the system server.

Thus, data can be pushed from any Web site accessed by a computer to a portable electronic device. The data, such as contact information, a memo, calendar data, map locations and bookmarks can be pushed from a computer to the portable electronic device rather than manual typing of such information into the portable electronic device and the data is automatically associated with the respective application and stored in the appropriate database for viewing when using the associated application. A method may therefore be provided for transfer of information from a computer that is not normally synchronized with the portable electronic device.

In a particular aspect, a first server may receive a request to push the data to a particular mobile device. The data may be identified in the request using a unique identification. The data may be stored in association with the unique identification in a data store connected to a second server. When the push request is determined at the first server, the second server may be used to obtain the data by matching the unique identification received with the request to the data stored in association with the unique identification. The data may then be formatted for the portable electronic device and is transmitted to the portable electronic device.

To place a link on a Web site for pushing data to a portable electronic device, a request for a push link may be made to a system server from any other computer via the Internet and the requester uses a login and, for example, a password for identification authentication. The requestor may then be prompted for the data for storage in the data store and the data is assigned a unique identification. A hypertext transfer protocol (http) link may be returned including the unique identification for addition to the Web site.

In the above aspects, data is only provided from authorized sources as the creation of the http link requires an identification and authentication of the requestor. Further, the data is verified by controlling the protocol and formatting the data prior to transfer to the portable electronic device, thereby providing a level of security.

BRIEF DESCRIPTION OF THE DRAWINGS

The system and method for transferring data to a portable electronic device will be better understood with reference to the following description and to the Figures, in which.

DESCRIPTION OF PREFERRED EMBODIMENTS

Figure 1:
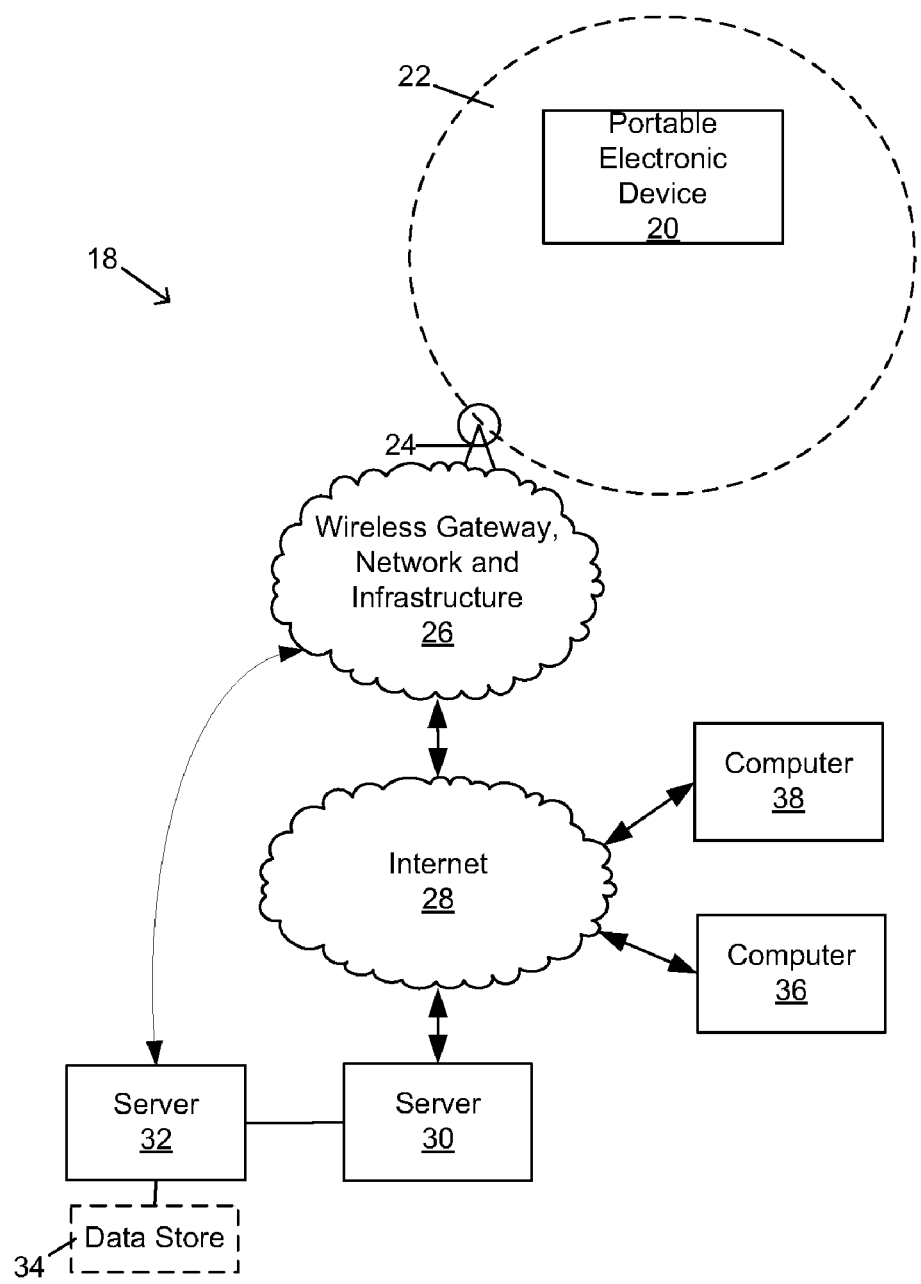
FIG. 1 is a functional block diagram of a radio communication system for transferring data to a portable electronic device in accordance with one embodiment.

Reference is first made to FIG. 1 which shows a functional block diagram of a radio communication system indicated generally by the numeral 18 and a portable electronic device 20. The radio communication system 18 (referred to herein as the communication system 18) provides for communications with portable electronic devices including the exemplary portable electronic device 20, as shown. The portable electronic device 20 and the communication system 18 are operable to effect over-the-air communications therebetween via a radio communications channel. Data originating at the portable electronic device 20 is communicated to the communication system 18 by way of the radio communications channel. Similarly, data originating at the radio communication system 18 is communicated from the communication system 18 to the portable electronic device 20 by way of the radio communications channel, thereby providing data to the portable electronic device 20.

For the purposes of illustration, the communication system 18 is functionally represented in FIG. 1 and a single base station 24 is shown. The base station 24 defines a coverage area, or cell 22 within which communications between the base station 24 and the portable electronic device 20 can be effectuated. It will be appreciated that the portable electronic device 20 is movable within the cell 22 and can be moved to coverage areas defined by other cells that are not illustrated in the present example. The communication system 18 includes a wireless gateway, network and infrastructure 26 that is connected to the Internet 28 for communication with a system server 30. The system server 30 is implemented, for example, on a network computer within the firewall of a corporation, and acts as the main interface for data sent to and from the portable electronic device 20. The system server 30 is connected to a second server, referred to as a data server 32 that is functionally coupled to a data store 34 for storage of data for transmission to portable electronic devices such as the exemplary portable electronic device 20 shown in FIG. 1. As shown, the data server 32 is connected to the wireless gateway, network and infrastructure 26 for wireless transmission of data.

It will be appreciated that many computer systems are connected to the Internet including, for example, personal computers connected to the Internet via Internet Service Providers (ISPs), company computers connected to local area networks (LANs) that are connected to the Internet, Web servers that are responsible for accepting http requests from a Web browser and providing http responses along with data such as Web pages and links, and others. Only two such exemplary computers 36, 38 are shown connected to the Internet for the purpose of the present discussion.

Figure 2:
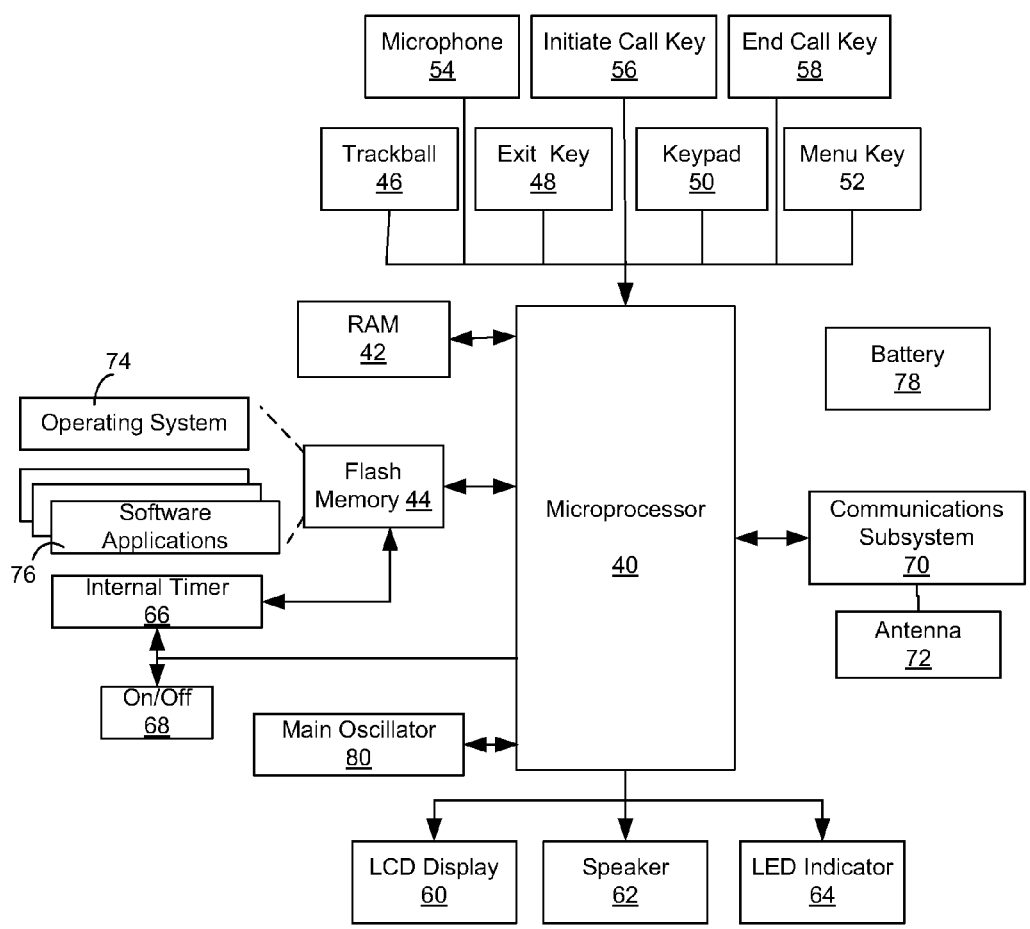
FIG. 2 is a block diagram showing components of a portable electronic device.

Referring now to FIG. 2, there is shown a block diagram of the portable electronic device 20. The portable electronic device 20 is based on the computing environment and functionality of a hand-held wireless communication device. The portable electronic device 20 is based on a microcomputer that includes a microprocessor 40 (also referred to as a processor) connected to a random access memory unit (RAM) 42 and a persistent storage device 44 that is responsible for various non-volatile storage functions of the portable electronic device 20. Operating system software executable by the microprocessor 40 is stored in the persistent storage device 44, which in the present embodiment is flash memory. It will be appreciated, however, that the operating system software can be stored in other types of memory such as read-only memory (ROM). The microprocessor 40 receives input from various input devices including, for example, a trackball or trackwheel 46, an exit key 48, a keypad 50, a menu key 52, a microphone 54, an initiate call key 56, and an end call key 58. The microprocessor 40 outputs to various output devices including the LCD display 60, the speaker 62 and the LED indicator 64. The microprocessor 40 also interacts with on/off circuitry 66 for powering up and powering down the portable electronic device 20, and an internal timer 68.

In the present embodiment, the portable electronic device 20 is a two-way RF communication device having voice and data communication capabilities. The portable electronic device 20 also includes Internet communication capabilities. Two-way RF communication is facilitated by a communications subsystem 70 that is used to connect to and operate with a complex voice and data network such as a GSM/GPRS, CDMA, EDGE, UMTS or CDMA2000 network, via the antenna 72.

As indicated above, the flash memory 44 stores the operating system software 74 and a plurality of software applications 76 executable by the microprocessor 40 that enable the portable electronic device 20 to perform certain operations including the communication operations referred to above. Applications software is provided including, for example, PIM applications such as an electronic mail (Messages) application, an Address Book application, a Tasks application, and a Calendar application, as well as other applications such as a Web Browser application. Data associated with each of the applications is stored in databases at the flash memory 44. Thus, contact data is stored in an address book database. Similarly, calendar data is stored in a calendar database.

In a data communication mode, a received signal such as a text message or Web page download is processed by the communications subsystem 70 and input to the microprocessor 40 for further processing of the received signal for output to the LCD display 60. A user of the portable electronic device 20 can also compose data items within a software application such as a message application using the keypad 50, for example, in conjunction with the trackball 46 and the LCD display 24. Such composed items can then be transmitted over a communications network through the communications subsystem 46 and antenna 48.

Although not shown, a short-range communications subsystem can also be provided for communication between the portable electronic device 20 and other devices or systems. Such short-range communications subsystems include, for example, an infrared device as well as associated components and circuitry, and a Bluetooth™ communication system.

A rechargeable battery 78 such as a Li-ion battery is provided for powering the portable electronic device 20.

The user can power down the portable electronic device 20 to a power-off or low-power state by pressing a power on/off button (not shown). Alternatively, the device can be powered up or powered down using a combination of buttons that activate the on/off circuitry 68. As indicated above, the portable electronic device 20 includes an internal timer 66 that can also deliver an interrupt on an interrupt line to power up the portable electronic device 20 when the portable electronic device 20 is in a power-down state and to power down the device when the portable electronic device 20 is in the power-up state. The internal timer 66 is responsible for keeping track of the date and time when the portable electronic device 20 is turned off. A main oscillator 80 is also provided for generating a relatively high-frequency (MHz) clock signal compared to that generated by the oscillator that is part of the internal timer 66 (tens of kHz). The main oscillator 80 includes circuitry that operates when the portable electronic device is on for providing a clock signal to the microprocessor 40 and other components.

Data including, for example email messages, is received on the electronic device 20 through the communication system 18 that wirelessly connects to the electronic device 20 via the communications subsystem 70 through the antenna 48.

Figure 3:
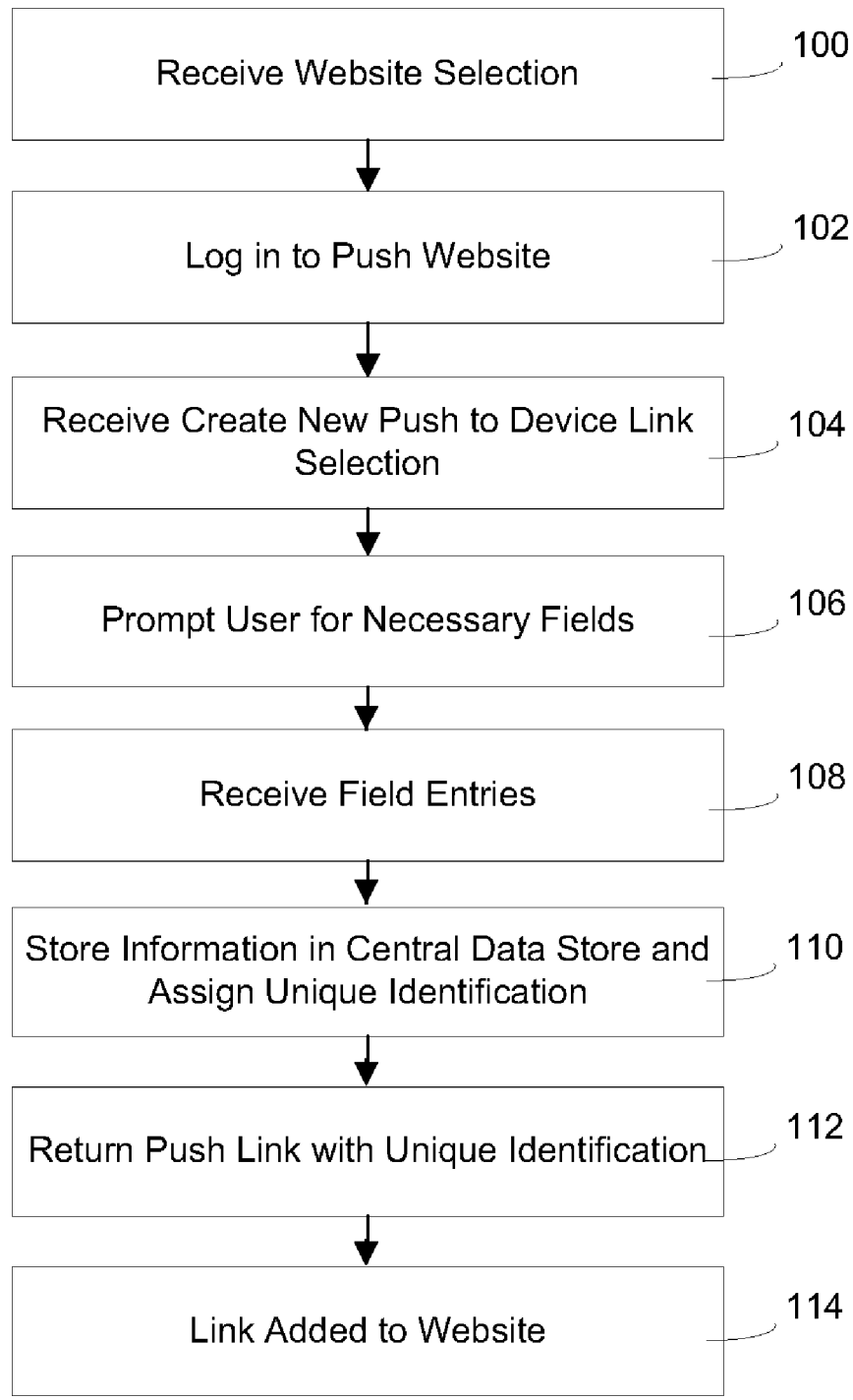
FIG. 3 is simplified flowchart showing steps in a method of transferring data to a portable electronic device in accordance with an embodiment.

Reference is now made to FIG. 3 to describe a method for transferring data to a portable electronic device. Coding of software for carrying out the steps illustrated in FIG. 3 is well within the scope of a person of ordinary skill in the art. As shown in FIG. 3, the computer 36 is used to access a Web site hosted by the system server 30 at step 100. It will be appreciated that the system server is a computer that is responsible for http communication by accepting http requests via a Web browser and providing an http response. The user of the computer 36 therefore uses a Web browser to access a Web page. A login prompt is provided via the http response displayed using the Web browser on the computer 36 and the user enters login information such as a user name and password. The login information is received at the system server 30 and is matched to login information of authorized users. Thus, the user logs in to the Web site at step 102 for authentication of the user's identity prior to providing services as described below.

After logging in, an http response is sent from the system server 30 to the computer 36 along with a Web page including a link, selectable by the user, for creating a new link for pushing data to a portable electronic device, at step 104. The user is then prompted for the data to be pushed to the portable electronic device, by user entry of fields at step 106.

The user is prompted to select a type of data to be provided. For example, options for contact information for an address book, a bookmarked Web address for a browser, a location, such as the location of a local restaurant a task, a memo, a calendar event, a picture option, any additional suitable options and any combination of these options can be provided.

With the selection of one of the options, the user is prompted for data input relating to the selected option. Alternatively, a page is loaded to assist the user with entry of data based on the selected option. It will be appreciated that certain fields can be default fields requiring data entry by the user. For example, at least one field must be populated for a memo.

The user enters the data through the Web browser and the data is sent to the system server 30 where it is received at step 108. It will be appreciated that other options such as a preview option can also be provided for user previewing prior to sending the data.

Upon receipt of the data at the system server, a unique identification number or code is assigned to the data and the data is sent to a data server 32 connected to the system server 30 for storage in the data store 34 at step 110. The data is stored in the data store 34 in association with the unique identification code, for example, in a table in which the data is matched with the unique identification code.

Next a push link is generated at the system server 30, encrypted, digitally signed and sent to the computer 36 at step 112. The push link is created as an http link for requesting to send data in response to selection of the link. The user of the computer 36 the places the link on a Web page of a Web site hosted at the computer 36 at step 114. Thus, an http link is provided for selection by a third party for providing the data entered at step 106 and associated with the unique identification code at step 110.

The method of FIG. 3 will now be described with reference to a specific example. In the present example, the user of the computer 36 wishes to prepare a Web page with content including contact information for a company, for example. Thus, in the present example, the computer 36 is a Web server for a company for providing http communication including data such as Web pages and links. A link is created for providing the contact information for the company to a portable electronic device. To create the link, the user of the computer 36 accesses the Web site hosted by the system server 30 at step 100 and the user is prompted to log in. The user enters a previously assigned user name and password and the user name and password is received at the system server 30 and matched to login information of authorized users. For the purpose of the present example, the user is an authorized user and thus, the user is logged in to the Web site at step 102 and provided further services.

After logging in, a Web page including a link is provided for user viewing via the Web browser. The link is selected by the user for creating a new link for pushing data to a portable electronic device, at step 104. In the present example, the user selects the link and is provided with a prompt to indicate the type of data to be provided. For exemplary purposes, the user selects an option to provide contact information for an address book at a portable electronic device. It will be appreciated that other options can be provided for pushing other data types to portable electronic devices. For example, options for providing a bookmarked Web address for a browser or information such as a location, for example, a location of a local restaurant, can be provided. Other options such as a task, a memo, a calendar event or a picture option can also be provided.

With the selection of one of the options, a page is loaded to assist the user with entry of data based on the selected option. In the present example, a page is loaded for entry of the fields of the contact at step 106, including for example, a contact name, an address, a telephone number, a fax number, an email address and any additional notes. The user enters the fields of data, as desired, and the entered data is sent to the system server 30 upon user selection of an option to send the data, at step 108. It will be appreciated that other options such as a preview option can also be provided for user previewing prior to sending the data.

Next a unique identification number or code is assigned to the contact data by the system server 30 and the contact data is sent to the data server 32 for storage in the data store 34 in association with the unique identification code at step 110.

The push link is then generated at the system server 30, encrypted and digitally signed. The push link includes the unique identification code, and is sent to the computer 36 at step 112. For example, a link such as http://www.portabledevice.com/pushtodevice.dll?uniqueID=1029482 can be provided. In this case, the unique identification code assigned to the data is 1029482. The user of the computer 36 then places the link on the desired Web page for portable electronic device users to access and select to have the contact sent to their portable electronic devices, at step 114. It will be appreciated that the link can be placed, for example, under contact information with a heading that indicates "Send to my Portable Electronic Device", or any other suitable identifier.

Figure 4:
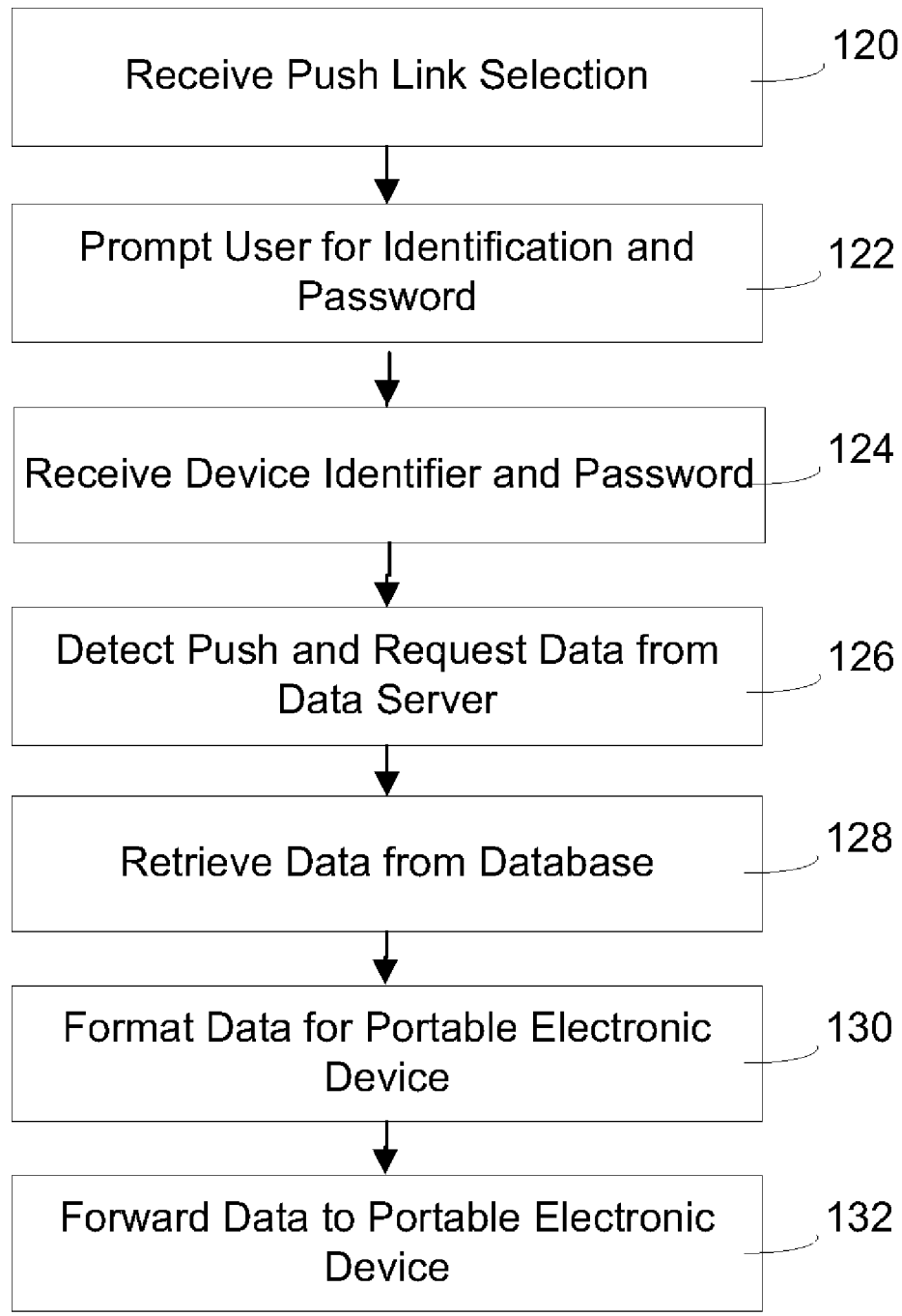
FIG. 4 is simplified flowchart showing further steps in a method of transferring data to a portable electronic device in accordance with an embodiment.

Reference is now made to FIG. 4 to describe a method of transferring data to a portable electronic device. Coding of software for carrying out the steps illustrated in FIG. 4 is well within the scope of a person of ordinary skill in the art. In the present embodiment, a computer 38 with a Web browser is used to access the Web page that includes the push link for transferring data to a portable electronic device. The computer 38 can be any computer device with a Web browser. A user of the computer 38 accesses the Web site hosted by the computer 36 and selects the http push link provided on the Web page to have data transferred to the user's portable electronic device at step 120. Upon selection of the push link, the user is prompted for a unique identifier for the portable electronic device 20 and a password or other suitable authentication at step 122. It will be appreciated that selection of the link sends an http request to the Web server which provides an http response in the form of a login requiring a unique portable electronic device identifier (an identifier that is unique to the user's portable electronic device 20) for the purpose of sending data and a password for authenticating the user requesting sending of the data. The portable electronic device identifier and the password are received at the system server 30 and compared to portable electronic device identifiers and corresponding passwords at the system server 30 to find a match for authorized users, at step 124. It will be appreciated that if the portable electronic device identifier and the password are not matched to that of an authorized user, the method does not proceed. For example, the user can be provided with a notification that the authentication failed along with a prompt to enter the information again. Alternatively, an error notification can be displayed.

After authentication by matching the portable electronic device identifier and password to an identifier and corresponding password for an authorized user, the system server 30 detects the push command by detecting receipt of the http post request for the unique identification code assigned to the data and the portable electronic device identifier, at step 126. The system server 30 then communicates with the data server 32 to process the request and the data server 32 retrieves the requested data by matching the unique identification code assigned to the data, with the data at step 128. Next, the data is formatted by the data server 32 into a form for processing by the portable electronic device 20 upon receipt, at step 130. The formatted data is then sent over the Internet 28, via the wireless gateway, network and infrastructure 26, to the portable electronic device 20 at step 132. Thus, the data is wirelessly transmitted to the portable electronic device 20.

The method of FIG. 4 will now be described with reference to the specific example described above. For the purpose of the present example, the computer 38 is a public computer connected to the Internet via an internet service provider. It will be appreciated, however, that the computer 38 can be any suitable computer device with Internet access. The user of the computer 38 accesses the Web page that includes the http push link, using any suitable Web browser. The user wishes to have the contact information for the company contact added to the address book of the user's portable electronic device 20. Thus, the user selects the push link by, for example, clicking on the link provided on the Web page (step 120). In response, the user is prompted for an identification number for the portable electronic device 20 and a previously assigned password (step 122). For the purpose of the present example, the unique portable electronic device identifier is an identification number for the user's portable electronic device 20. The identification number and password are received at the system server 30 and compared to portable electronic device identifiers and corresponding passwords at the system server 30. In the present example, the user is an authorized user and the user correctly enters the unique identification number for the portable electronic device 20 and the password. Thus, the user is authenticated and the method proceeds to step 126.

After authentication, the Web server detects the push command by detecting receipt of the http post request for the unique identification code assigned to the data and the portable electronic device identifier, at step 126. For the purpose of the present example, the push command is of form <a href=http://www.portabledevice.com/pushtodevice.dll?uniqueID=1029482>. The system server 30 then communicates with the data server 32 to process the request and the data server 32 retrieves the requested data by matching the unique identification code assigned to the data (1029482), with the contact data at step 128. Next, the contact data is formatted by the data server 32 into a suitable form for processing and storing in the address book of the portable electronic device 20, at step 130. The formatted contact data is then sent from via wireless transmission to the portable electronic device 20 at step 132 where the contact is added to the address book database at the portable electronic device 20 for viewing using the address book application.

Reference is now made to FIG. 3 to describe another example. Again, the user of the computer 36 wishes to prepare a Web page with content including contact information. A link is created for providing the contact information for the company to portable electronic devices by accessing the Web site hosted by the system server 30 at step 100. The user is prompted to log in. The user enters a previously assigned user name and password and the user name and password are received at the system server 30 and matched to login information of authorized users. For the purpose of the present example, the user is an authorized user and thus, the user is logged in to the Web site at step 102 and provided further services.

After logging in, a Web page including a link is provided for user viewing via the Web browser. The link is selected by the user for creating a new link for pushing data to a portable electronic device, at step 104. In the present example, the user selects the link and is provided with a prompt to indicate the type of data to be provided. For exemplary purposes, the user selects an option to provide contact information for an address book at a portable electronic device. Again, it will be appreciated that other options can be provided for pushing other data types to portable electronic devices.

The user is then prompted for entry of the fields of the contact at step 106, including for example, a contact name, an address, a telephone number, a fax number, an email address and any additional notes. The user enters each field of data and the entered data is sent to the system server 30 upon user selection of an option to send the data, at step 108.

Next, a push link is created at the system server 30, including the contact information sent to the system server 30. For example, a link such as http://www.portabledevice.com/pushtodevice.dll?Emailaddr=bjones@ped.com&workphone=1-416-555-5555>can be provided. In this case, the contact information provided in response to the prompting for entry of fields of the contact at step 106 includes an email address of bjones@ped.com and a work phone number of 1-416-555-5555. The user of the computer 36 then places the link on the desired Web page for portable electronic device users to access and select to have the contact sent to their portable electronic devices. It will be appreciated that the link can be placed, for example, under contact information with a heading that indicates "Send to my Portable Electronic Device", or any other suitable identifier. According to the present example, the contact information entered at step 108 is not stored in a data store and no unique identification is assigned as in the first-described example. Instead, the link provided for placement on the Web page includes the contact information.

Continuing with the present example and referring now to FIG. 4, the user of the computer 38 accesses the Web page that includes the http push link, using any suitable Web browser. The user wishes to have the contact information for the company contact added to the address book of the user's portable electronic device 20. Thus, the user selects the push link by using a mouse to click on the link provided on the Web page (step 120). In response, the user is prompted for an identification number for the portable electronic device 20 and a previously assigned password (step 122). Again, the identification number is a unique portable electronic device identifier for the user's portable electronic device 20. The identification number and password are received at the system server 30 and compared to portable electronic device identifiers and corresponding passwords at the system server 30. In the present example, the user correctly entered the unique identification number for the portable electronic device 20 and the password and therefore the user is authenticated and the method proceeds to step 126.

After authentication, the contact data is sent to the portable electronic device 20 via the system server 30 for storage in the address book database of the portable electronic device 20. Thus, the data is not stored in the data store and there is no matching of any unique identification.

While the embodiments described herein are directed to particular implementations of the electronic device and method of controlling the electronic device, it will be understood that modifications and variations to these embodiments are within the scope and sphere of the present application. For example, in the examples described above, the user of the computer 36 entered a user name and password prior to creating a link to be added to a Web page. It will be appreciated that this is not necessary, however and that any user can be permitted to create a link. The use of a user name and password provides a level of security by permitting only authorized persons to create links. Although not described above, it will be appreciated that an option can be provided for a user to preview the contents of a link prior to selecting to push the data to the user's portable electronic device. Further, the data can be encrypted.

The data for pushing to the portable electronic device is described as being a contact for an address book, a bookmarked Web address for a browser, a location, a task, a memo, a calendar event, and a picture. The data that is pushed using a single link is not limited to a single contact, Web address, location, task, memo, calendar event, or picture, however. Rather than a single data item, multiple data items can be grouped so that more than one data item is transferred to the portable electronic device. The grouping of data can be accomplished in many ways. For example, when creating the link, a "group" option can be provided for user selection at step 104. Thus, the group option can, for example, result in the user being provided with a further option to select the next type of data and a page can be loaded to assist the user with entry of data based on the selected option. Upon entry of the data in the page, the user can be provided with an option to select the next type of data and to indicate that the group of data is completed. Each item of the group can be provided with its' own unique identification and the final group can be given a unique identification that is related to the combination of all of the unique identifications for the individual data items. Thus, when a portable electronic device user selects the link, multiple data items are pushed to the portable electronic device.

In the above-described embodiments and examples, the data for pushing to the portable electronic device is entered by a user at step 106 by prompting the user for data input or by loading a page to assist the user with entry of data based on the selected option. It will be appreciated that other methods of data entry are possible. For example, data can be entered on to a page and sent to data entry personnel within a company or data can be entered by a phone call or electronic mail to data entry personnel within a company.

Many other modifications and variations may occur to those skilled in the art. All such modifications and variations are believed to be within the sphere and scope of the present application.

The invention claimed is:

1. A method of transferring data to a portable electronic device, the method comprising:
   receiving a request from a first machine to create a web link;
   in response to receiving said request to create said web link, prompting regarding data to be associated with said web link;
   providing said web link associated with said data, said web link operable to cause said data to be pushed to a portable electronic device;
   upon receiving a selection of said web link from a second machine,
   prompting for an identifier of a portable electronic device for delivery of said data thereto; and
   transmitting said data to said portable electronic device.

2. The method according to claim 1, wherein providing said web link comprises providing a Hypertext Transfer Protocol 'HTTP' link.

3. The method according to claim 2, comprising generating, encrypting and digitally signing said HTTP link, in response to receipt of a request to create said web link, prior to said providing said HTTP link.

4. The method according to claim 1, further comprising: storing said data in association with said web link in a data store prior to providing said web link.

5. The method according to claim 4, comprising assigning a unique identification to said data, wherein said storing said data comprises storing said data identified by said unique identification, and said providing said web link comprises providing said web link including said unique identification.

6. The method according to claim 4, comprising retrieving said data from said data store prior to transmitting.

7. The method according to claim 6, comprising formatting said data for said portable electronic device prior to transmitting.

8. The method according to claim 4, wherein said storing said data comprises forwarding said data to a further server for storage in said data store.

9. The method according to claim 8, comprising requesting said data from said further server in response to receipt of selection of said web link.

10. The method according to claim 9, comprising formatting said data at said further server for said portable electronic device prior to said transmitting.

11. A system for transferring data to a portable electronic device, the system comprising:
    at least one system server connected to a network and operable to execute applications for causing said server to implement a method, the method comprising:
    receiving a request from a first machine to create a web link;
    in response to receiving said request to create said web link, prompting regarding data to be associated with said web link;
    providing said web link associated with said data, said web link operable to cause said data to be pushed to a portable electronic device;
    upon receiving a selection of said web link from a second machine,
    prompting for an identifier of a portable electronic device for delivery of said data thereto; and
    transmitting said data to said portable electronic device.

12. A computer program product for controlling a system server, said computer program product comprising a non transitory computer-readable medium having computer-readable code embodied therein for implementing a method, the method comprising:
    receiving a request from a first machine to create a web link;
    in response to receiving said request to create said web link, prompting regarding data to be associated with said web link;
    providing said web link associated with said data, said web link operable to cause said data to be pushed to a portable electronic device;
    upon receiving a selection of said web link from a second machine,
    prompting for an identifier of a portable electronic device for delivery of said data thereto; and
    transmitting said data to said portable electronic device.

13. The method of claim 1, wherein said data comprises a data item, the data item being at least one of a contact for an address book, a Web address, a location, a task, a memo, a calendar event, and a picture.

14. The method of claim 13, wherein said data comprises more than one data item.

15. The method of claim 1, wherein receiving selection of said web link comprises receiving selection of said web link from a web browser accessing a web page that includes said web link.

* * * * *